United States Patent

[11] 3,571,515

| [72] | Inventors | Rene B. Buron<br>Saint Paul;<br>Marc L. Levilion, Nice; Henri N. Nussbaumer, La Gaude; Etienne P. Paris; Vladimir R. Riso, Nice, France |
|---|---|---|
| [21] | Appl. No. | 736,357 |
| [22] | Filed | June 12, 1968 |
| [45] | Patented | Mar. 16, 1971 |
| [73] | Assignee | International Business Machines Corporation<br>Armonk, N.Y. |
| [32] | Priority | June 14, 1967 |
| [33] | | France |
| [31] | | 8568 |

[54] VOICE ANALYSIS AND RECOVERY SYSTEM
3 Claims, 19 Drawing Figs.

[52] U.S. Cl.................................................. 179/1
[51] Int. Cl................................................... G10l 1/00
[50] Field of Search........................................... 179/1 (AS), 15.55, 15 (ATC), 15 (ACE)

[56] References Cited
UNITED STATES PATENTS

| 3,278,907 | 10/1966 | Barry et al. | 179/15ATC |
| 3,349,183 | 10/1967 | Campanella | 179/15.55 |
| 3,445,606 | 5/1969 | Brightman | 179/15.55 |

OTHER REFERENCES

A Versatile Method for Short-Term Spectrum Analysis in Real Time, Nature by J. S. Gill 1/14/61
Analysis-Synthesis of Connected Speech in Terms of Orthogonalized Exponentially Damped Sinusoids by Manley, Journal of the Acoustical Sociaty of Americal, Vol. 35, No. 4 April 63

Primary Examiner—Kathleen H. Claffy
Assistant Examiner—Jon Bradford Leaheey
Attorneys—Hanifin and Jancin and John B. Frisone ABSTRACT: Vocal sound analysis device to represent the said sounds in the form of coded signals and recovery device, to reconstitute these sounds from the said coded signals. The vocal sounds to be analyzed are digitized, thus producing a signal which is time compressed, then decoded to obtain an analogue signal which is frequency expanded. The analysis is carried out on this last signal, by means of any type of analyzing device. The resulting signals are digitized and stored. At recovery, the coded signals are converted into frequency expanded analogue signals on which the reconstitution device operates. The reconstituted vocal signals are then digitized, expanded in time and decoded in order to obtain the original vocal sounds.

Patented March 16, 1971
3,571,515
14 Sheets-Sheet 9
FIG. 10
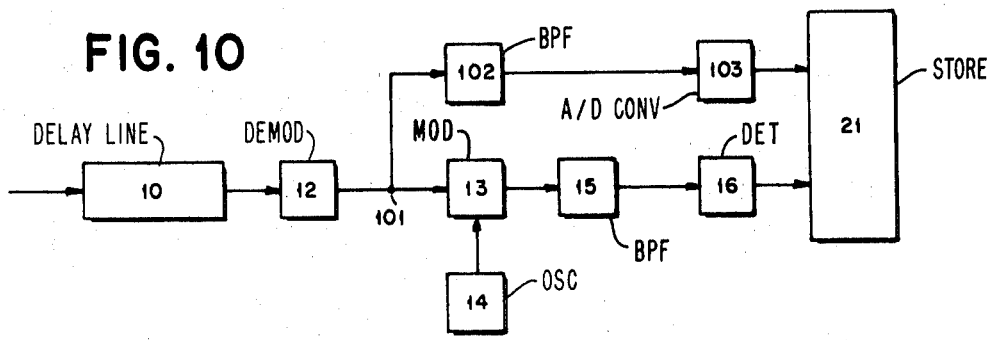
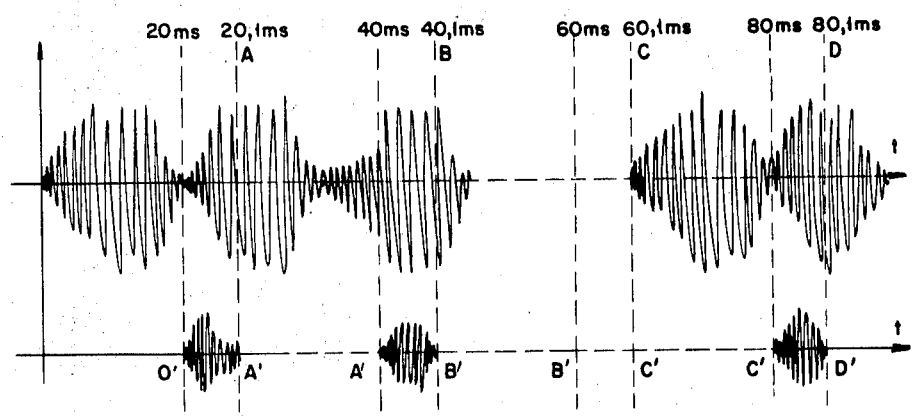
FIG. 11
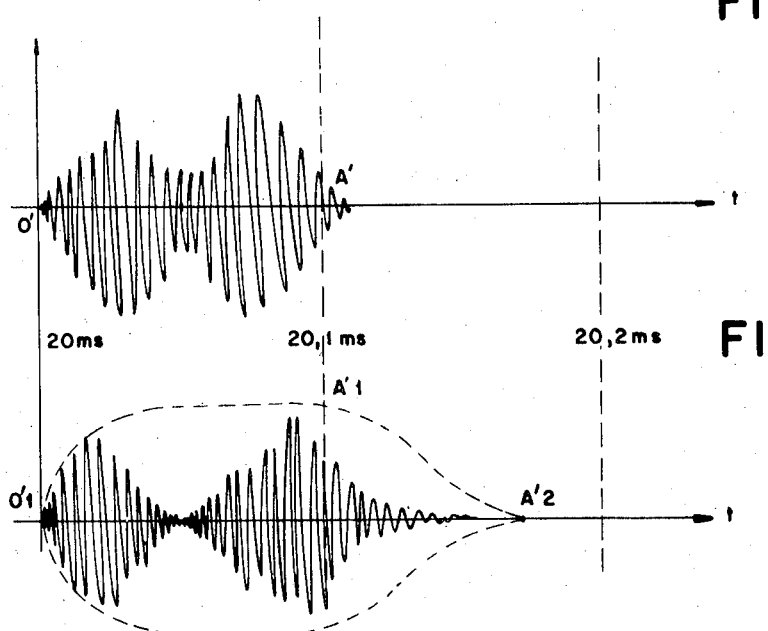
FIG. 12

VOICE ANALYSIS AND RECOVERY SYSTEM

The present invention concerns a device for analyzing vocal sounds so as to represent them in the form of coded signals, and a device used to reconstitute these sounds from the said coded signals. The vocal sounds to be analyzed are digitally coded, thus providing a signal which is compressed tin time, and then decoded to obtain a frequency expanded analogue signal. The latter signal may be analyzed by means of any type of analyzing device. The resulting signals are digitally coded and stored. At the reconstitution, the coded signals are converted again into frequency expanded analogue signals which are processed by the vocal sound reconstitution device. The recovered vocal signals are then digitally coded, expanded in time, and then decoded to obtain the original vocal sounds.

Methods are known whereby the vocal sounds are represented by means of signals whose transmission requires a frequency bandwidth much lower than that of the represented sounds while, however, retaining good intelligibility. Such methods are based on the reconstitution of vocal sounds comprising "voiced" sounds formed by a periodic succession of much dampened oscillation trains, and by "nonvoiced" sounds which do not present this periodic character. The frequency spectrum of the former is composed of a group of discrete frequencies, multiples of a fundamental frequency; the spectrum of the latter is a continuous spectrum where high frequencies predominate. The most used methods consist in representing the sounds by means of two functions, quantized in amplitude and defined at certain determined instants. The first of these functions called the "excitation function," defines the fundamental frequency, while the second one, called the "spectrum function," defines the energy contained within each frequency band resulting from the division of the spectrum.

During analysis effected with embodiments of such methods, difficulties were experienced which arose either from measurement of the fundamental frequency, from the determination of transitions between "voiced" and "nonvoiced" sounds, or finally from the description of the frequency instantaneous-spectrum envelope. Thus, in a vocoder of classical type, several channels cover the vocal frequency spectrum and permit the measurement of the vocal signal intelligibility carried by the amplitude of the frequency instantaneous-spectrum. The character of the voice reconstituted by such systems is not natural, since there is a lack of graduation in the energization modes of the filters sharing the spectrum. In other equipments, such as a base-band vocoder, an effort has been made in order to improve the naturalness obtained with classical vocoders, by improving the circuits determining the fundamental frequency and the transitions. However, in the base-band vocoder systems, the "spectrum function" poses as many problems. Indeed, in those systems wherein the "spectrum function" is no longer determined by seeking the spectrum amplitude in several narrow frequency bands, but by seeking the amplitude and frequency of the vocal spectrum maxima in a reduced number of wide frequency bands, the obtained level of intelligibility is lower than the one obtained in classical vocoder.

Consequently, the object of the invention is to improve the voice analysis devices and, more particularly, to improve the circuits providing the "spectrum function" while retaining the improvements already obtained in prior techniques with regards to the "excitation function."

One object of the present invention concerns a vocal sound analysis device in which the "spectrum function" is investigated by means of extremely stable and accurate filter which allows a rapid analysis of a very wide spectrum vocal signal, which signal has previously been time compressed.

The concept of the present invention, with regards to the "spectrum function" channel of the analyzing device, is to apply the vocal signal to be analyzed to an analogue-digital converter in order to convert it into digital form. The signal samples are introduced, in PCM modulation form (or Δ modulation) and at a certain speed, into a time compressing device from which they are then extracted at a much higher speed. The digitized samples coming out of the time compression device are returned to the input of the said device and are serially applied to the new incoming sample, so that all the samples are located in the compression device in the same order as they came in in real time. Since the interval separating two consecutive signal samples, at the compression device input, is much longer than the one separating two adjacent digitized samples at the output of that same device, the vocal signal iv very much compressed in time or, which is equivalent, is a signal whose frequency is expanded in time. With the help of a wideband filter, it is then possible to examine the expanded spectrum with a resolution as good as that of a narrow band filter working on the nontime compressed input vocal signal. Furthermore, the large bandwidth filter setup time is very short, thus enabling it to move quickly through the expanded spectrum of the vocal signal. The acceleration factor is chosen so as to permit total analysis of the vocal spectrum, by a large bandwidth filter, in a time period approximately equal to the time period required for analyzing only one resolution element at the analyzing device input. Thus, a simultaneous real time analysis is obtained.

Each new vocal signal sample introduced in a position of the compression device, replaces the oldest sample which occupied the same position in the device. The signal present in the compression device is thus constantly updated. The length of the said device, and the sampling speed are chosen in such a manner, that the considered band of the input vocal spectrum is examined before the register contents is subjected to an important change. This ensures that each vocal spectrum sample will contribute to the spectrum analysis within the limits imposed by the Fourrier integral.

The output of the time compression device, from where exits the digitized and compressed vocal signal, is connected to the input of a digital-analogue converter. The signal issuing from this device is then modulated by a variable frequency carrier and is applied to the stable wideband filter, to obtain the vocal spectrum analysis.

One object of the invention concerns a device used for reconstituting vocal sounds from signals which are obtained by analyzing the accelerated, coded and stored vocal signals, and permitting a rapid reconstitution of a very wide spectrum by means of an extremely stable and accurate filter.

The concept of the present invention, with regards to the vocal sounds reconstitution device, consists in extracting from the storage element the coded signals representing the result of the vocal signal analysis, that is to say the "spectrum function" and the "excitation function" of that signal. The signals representing each of these functions are applied to a digital-analogue converter to give them an analogue form. Thus is obtained, in analogue form, the "spectrum function" and "excitation function" analysis result. With the help of a wideband filter receiving the "excitation function" signal, it is then possible to reconstitute the various bands in which the compressed vocal signal has been analyzed and, with the help of an amplitude modulation of the wideband filter response, by the "spectrum function" samples, to reconstitute the various responses of the said filter when it travels through the frequency band corresponding to the vocal spectrum it is desired to reconstitute. These various responses are spread out in time and, to reconstitute a sample of the compressed vocal spectrum, it is necessary that all these response be present at the same instant. To this end, each new filter response is, after passage in an analogue-digital converter, introduced in an adding and storing device wherein it is digitally added to the already stored responses. This storing device also acts as a time expansion device for the vocal signal sample. To this end, the filter responses are introduced, at a given speed, in the expansion-addition device and when a number $n$ of them have been added, a reconstituted sample of the vocal signal is extracted, consequently the output speed of the expansion device is lower than its input speed. As a result, the spectrum is expanded in time. It is then possible, by extracting the digital form of a vocal signal sample reconstituted in the preceding device, and by applying it to a digital-analogue converter, to recover the original vocal signal.

Another object of the present invention concerns a voice analysis and recovery system wherein the analysis is carried out on the analogue form of time compressed vocal signal and the recovery is carried out from the time compressed analogue form of the coded signals, which represents the "excitation-function" and the "spectrum function" of the vocal signal.

Another object of the invention concerns a voice analysis and recovery system wherein the analyzing and recovery devices may be of any known type used in vocoders, but working on a time compressed vocal signal.

Another object of the invention concerns a voice analysis and recovery device permitting, on one hand, a simultaneous real time analysis of all the vocal signal frequency components situated in the analyzed bandwidth and, on the other hand, a simultaneous real time synthesis of all the frequencies making up the vocal signal that has to be reconstituted.

Another object of the invention concerns a voice analysis device of a type using a channel which defines an "excitation function" representing either the voice fundamental frequency, or a base-band, and a channel which defines a "spectrum function" representing the mean energy contained in various frequency bands making up the vocal spectrum, and concerns more particularly a voice analysis device characterized in that the vocal spectrum analysis is carried out on a time compressed signal and by the fact that it comprises:

a "spectrum function" channel comprising analogue-digital converting means which receive the vocal signal to be analyzed, to convert it into digital form;

means for time compressing which receive the output signal from the analogue-digital converting means and provides the time compressed form of the incoming digital signal;

digital-analogue converting means which receive the time compressed digital signal to convert it into analogue form;

means for analyzing the time compressed analogue vocal signal, which serially supplies analogue signals representing the response of the filters dividing the compressed vocal spectrum into several analysis bands;

energy detecting means which receive the signals issuing from the analyzing means and which provide, for each signal, a pulse whose amplitude is a function of the mean energy contained within the corresponding analysis frequency band;

means whereby the signals issuing from the energy detecting means can be put into a storable form; and an "excitation function" channel comprising:

means for extracting the "excitation function" which receive the vocal signal that has to be analyzed; and means for extracting the "excitation function"

means whereby the signals obtained at the output of the extraction means can be put into a storable form.

Another object of the invention concerns a voice recovery device of a type using, for reconstituting the vocal signal, some coded signals representing the "spectrum function " and "excitation function" information, signals which have been coded and stored during the analysis of the vocal signal that has to be recovered. It concerns more particularly a voice recovery device characterized in that the reconstitution of the vocal spectrum is effected within a time compressed domain, and comprises:

first digital-analogue converting means, to convert into an analogue form the coded signals representing the "excitation function" and the "spectrum function";

means for recovering, in time compressed form, the signals corresponding to the responses provided by the filter which have analyzed the compressed vocal spectrum, and for receiving the "excitation function" and the "spectrum function" provided by the first digital-analogue converting means;

analogue-digital converting means which receive the signal from the recovery means and corresponding to the analyzing filters responses, to convert it into digital form;

time expansion and addition means which receive the signals from the analogue-digital converting means in order to add and expand them, and which provide, at regular intervals, a pulse train representing the vocal signal in digital form; and second digital-analogue converting means which receive the signal from the expansion and addition means, to convert it into analogue form and thus provide the recovered vocal signal.

Another object of the invention concerns a voice analysis device wherein the time compression means are made up of a buffer-register, followed by a recycling delay line.

Another object of the invention concerns a voice analysis device wherein the analysis means comprise a variable band-pass filter allowing total scanning of the compressed vocal spectrum to be analyzed, and including a stepped oscillator which controls a modulator receiving the compressed vocal signal, the modulator output signal passing through a fixed band-pass filter and the said variable band-pass filter providing, for each oscillator frequency step, a signal corresponding to the analysis of the vocal spectrum within a given frequency band.

Another object of the invention concerns a voice recovery device wherein the expansion and addition means are made up by a recycling delay line.

Another object of the invention concerns a voice recovery device wherein the means used for reconstituting, in time compressed form, the response signals from the filters which have been used for analyzing the vocal signal, include a variable band-pass filter and an amplitude modulator such that:

the variable band-pass filter comprises a modulator which receives the signals from a stepped oscillator and the compressed "excitation function," and a fixed band-pass filter which receives the signal from the modulator; and the amplitude modulator receives the signal from the variable band-pass filter as well as the "spectrum function" signal, and provides the responses of the filter used in the analysis of the vocal signal.

Other objects, advantages and characteristics of the invention will become apparent from the following description and annexed illustrations of a preferred embodiment of the said invention.

In the drawings:

FIG. 1 schematically represents a voice analysis device in accordance with the invention, FIG. 2 schematically represents a voice recovery device in accordance with the invention, FIG. 3 is a schematic diagram in greater detail of a portion of the diagram of FIG. 1, FIG. 4 is a graph illustrating the oblique mode of operation, FIG. 5 illustrates the "memory" operation mode of the analysis device delay line, FIG. 6 represents the vocal signal in real time and in compressed time, FIG. 7 represents the compressed signal, modulated for analysis by filter Fo, and corresponding filter F1 in normal time, FiG. 8 represents the normal scanning, and zigzag scanning, operation of the analyzer variable filter, FIG. 9 represents a particular analyzer embodiment, according to the invention, FIG. 10 schematically represents the "spectrum function" and the "excitation function" storage, FIG. 11 represents the various time compressed vocal signal samples, FIG. 12 represents the response of the analysis filter to a sample 0' A' of the compressed vocal signal, FIG. 13 is a schematical representation of a filter response recovery device used in the voice recovery device;

FIG. 14 illustrates the output signals obtained from the filters of a classical vocoder recovery device, and those obtained from the filter of the recovery device according to the present invention, FIG. 15 is a graphic representation of the process of adding the various responses from N simulated filters, FIG. 16 is a graphic representation of the timing in the delay line of FIG. 2, FIG. 17 illustrates the method used for extracting the information contained in the delay line.

The principle of the invention will now be described, taking a base-band as the "excitation function." However, it must be understood that the "spectrum function" generator circuit could just as well be used with another known type of "excitation function" such as, for example, the "excitation function" of a classical vocoder.

Figure 1:
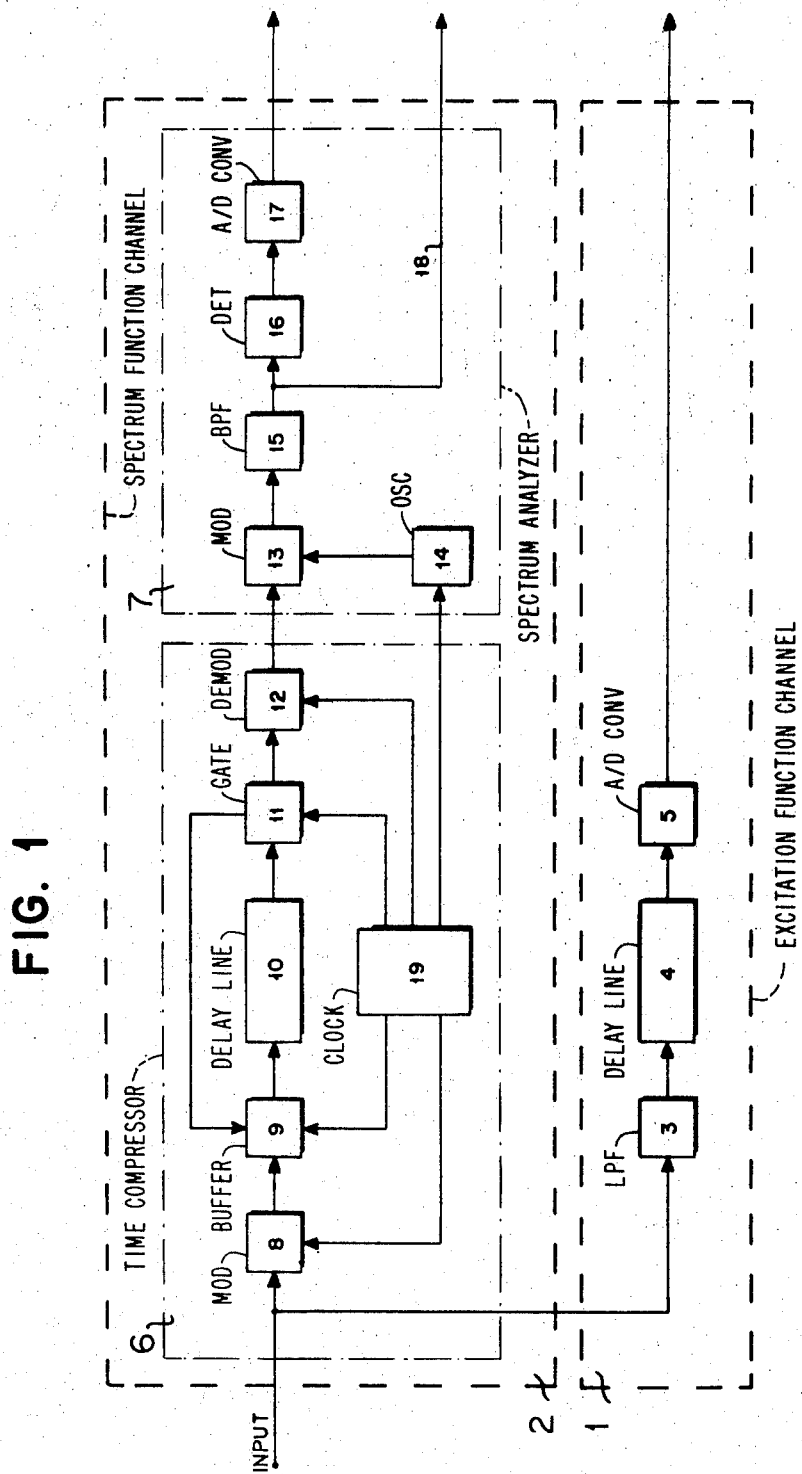
Figure 2:
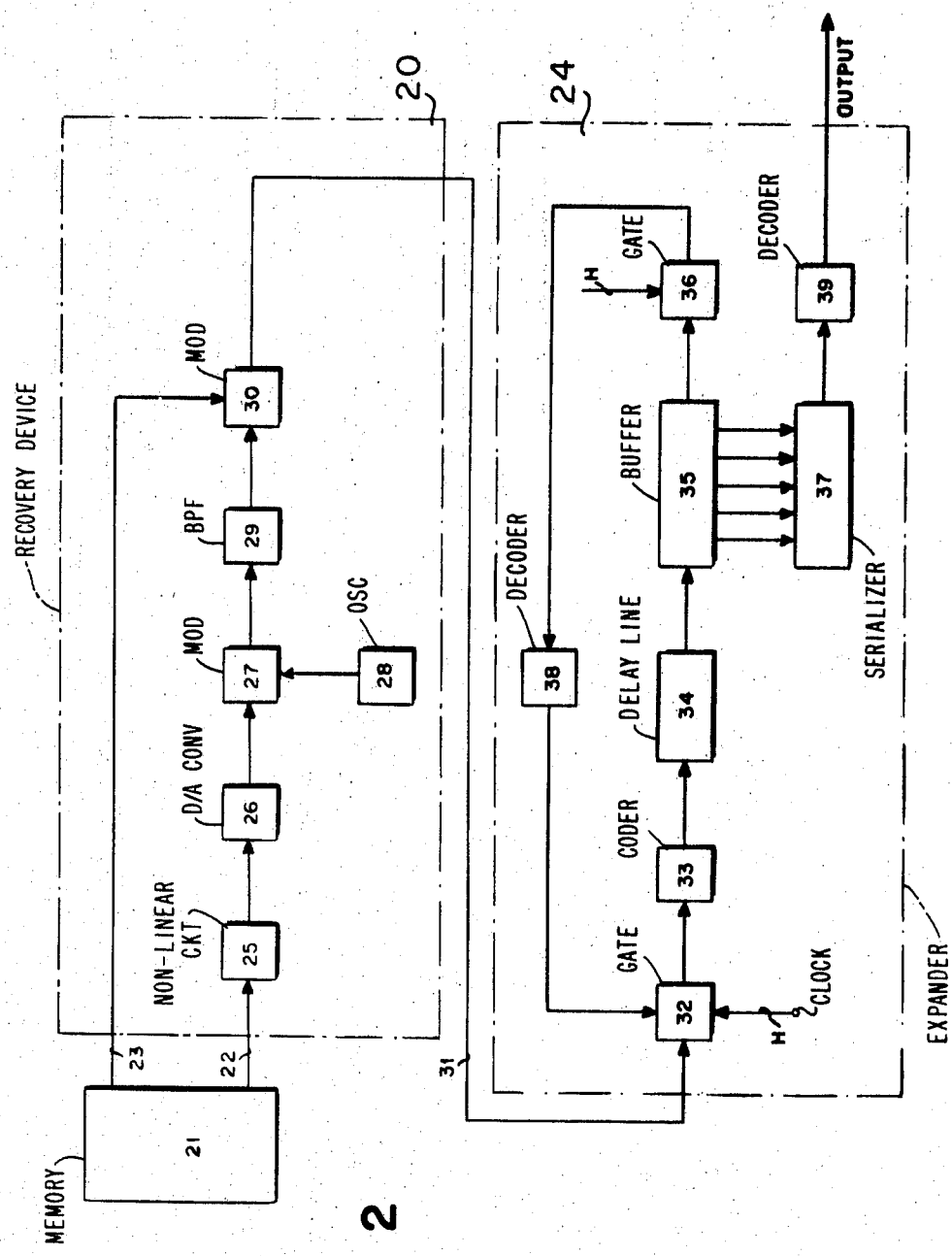

FIG. 1 is a block diagram representing the voice analysis device, while FIG. 2 is a block diagram of the voice recovery device, both in accordance with the present invention. Referring to FIG. 1, it can be seen that the analysis device comprises two channels: the "excitation function," channel 1, and the "-spectrum function," channel 2. The former is of the classical type used in base-band vocoders and includes a low-pass filter 3 defining the base-band, analogue delay line 4 ensuring that the "excitation function" is picked up from the output of its own channel at the same time that the "spectrum function" is picked up from the output of the "spectrum function" channel, and an analogue-digital converter 5 for storing the "excitation function" data. The "spectrum function" channel 2 is made up of two parts: a time compression device 6 followed by a spectrum analysis device 7. The vocal signal applied to the compression device is coded in digital form (PCM-ΔModulation) in modulator 8. The output from this device is applied, via buffer 9, to the input of a delay line 10 whose output is looped back to the input via gate 11, and buffer 9. The output from gate 11 is connected to a demodulator 12 which decodes the digital signal and provides the vocal signal in analogue form and compressed in time. This last signal will be applied to the analysis device 7 which comprises modulator 13, controlled by the stepped oscillator 14, thus, the output signal from modulator 13 will pass in front of the window defined by band-pass filter 15, the output signal of which is detected by the level detector 16 and applied to an analogue-digital converter 17. The output signal from filter 15 is transmitted towards the channel analogue output via line 18. A clock 19 controls the various circuits of device 2.

The voice recovery device represented on FIG. 2 is made up of two parts: the recovery device 20 proper, which receives, from memory 21, the "spectrum function" data on line 23 and the "excitation function" data on line 22, and the time expanding device 24. The base band is classically processed in circuits 25 and 26, according to a nonlinear process, so as to be transformed into a flat spectrum over the vocal spectrum range. The output signal from circuit 26 is applied to modulator 27, which modulator receives also a signal coming from a stepped oscillator 28. The output signal from modulator 27 goes through band-pass filter 29 and is applied to modulator 30 which also receives via line 23, the "spectrum function" data issued from the memory. The output signal from modulator 30 is sent to the expansion device 24, via line 31, wherein it passes through gate 32 prior to being applied to coder 33 (PCM-Δmodulation). The digital signal thus obtained is applied to delay line 34 where it is expanded in time. The expanded signal is then injected into buffer circuit 35, one output of which is applied to gate 36 and another one to serializer 37. The output from gate 36 is applied to decoder 38 (PCMΔ-Modulation) in order to obtain the analogue signal which is reinjected into gate 32. The output from serializer 37 is sent to a decoder 39 whose output provides the reconstituted vocal signal. Gates 32 and 36, the modulators and demodulators, the coders and decoders, are all under control of clock H.

Considering a vocal signal, applied at the analysis device input, the said signal is coded in PCM or Δ modulation in the analogue-digital converter or modulator 8. Before describing the process to which the digital signal will be subjected, certain parameters will be defined:

$W$ seconds = duration of the recorded data stored in delay line 10, $\tau$ seconds = space between bits, at the output of coder 8, $$C = \frac{W}{T}$$

is the number of bits describing the recording contained in delay line 10, $T$ seconds = duration of delay line 10, $o$ seconds = space between bits in delay line 10, $k$ = number of bits store/ in buffer circuit 9, $\alpha$ = number of analysis carried out.

There are two methods of using delay line 10 in order to carry out the frequency multiplication, both these operation modes, respectively called oblique mode and memory mode, will be considered.

The oblique mode operation will now be explained. The output signal from coder 8 is injected into buffer circuit 9 in which $k$ bits are stored, with an interval between bits of $\tau$ seconds. Consequently, the beginning of each bit pack, at the output of buffer circuit 9, is separated by an interval $k\tau$ from the beginning of the following pack, and the bit packs are injected into the delay line in such a manner that the interval separating two consecutive bits in a same pack is equal to $o$ and that the interval between the last bit of a pack and the first bit of the following pack is also equal to $o$. Buffer circuit 9 permits compression of the signal. Reading the contents of the delay line (which plays the role of a memory) is continuous, demodulator or converter 12 receiving the pulses contained in the said line in a continuous fashion. Similarly, these impulsions are rejected continuously into the line input. Since $\tau$ seconds is the time duration of delay line 10, and besides, since the relations $k\tau = \tau + ko$ is realized, taking into account that $$C = \frac{1}{\theta},$$

it can be seen that every $\tau$ seconds the $C$ bits describing the recording of $W$ seconds contained in delay line 10 will be read and likewise, the contents of $ko$ seconds in the delay line will be destroyed every $\tau$ seconds in order to be able to introduce new information. This destruction will be made for instance with the help of gate 11 the output of which corresponding to the feedback loop will be closed during $ko$ seconds every $\tau$ seconds.

Figure 3:
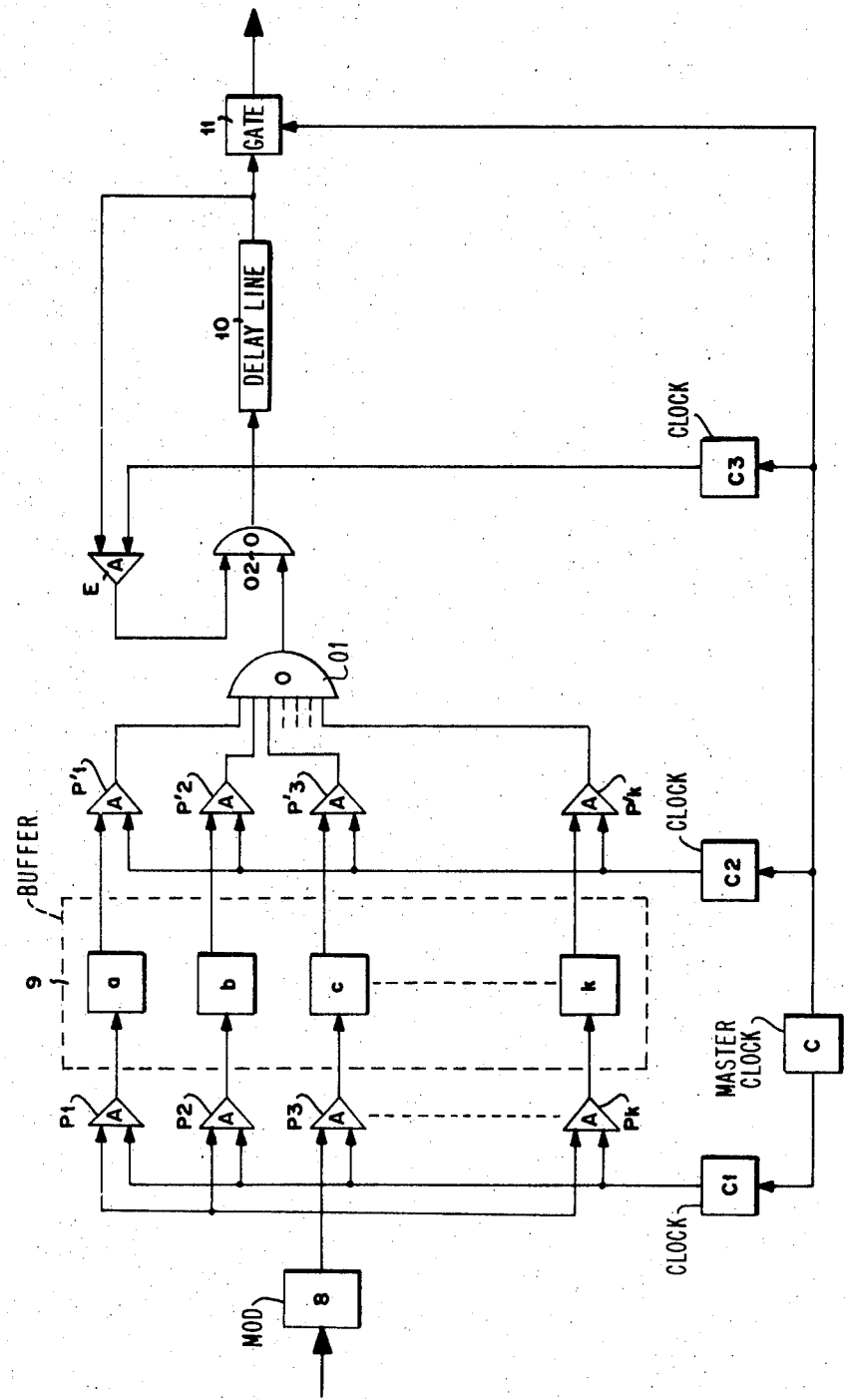
Figure 4:
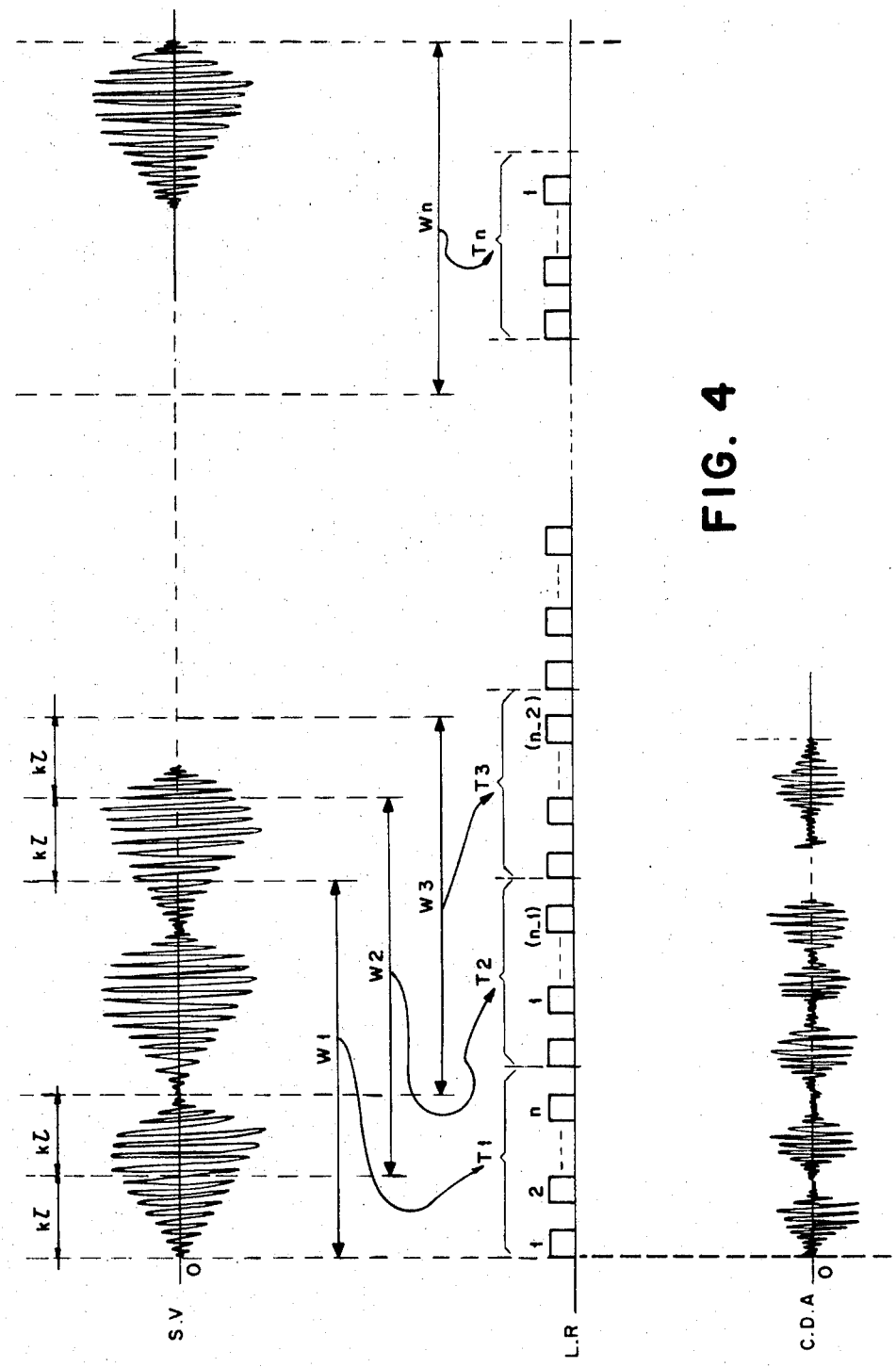

FIG. 3 shows how delay line 10 operates in the Oblique Mode. An AND circuit assembly P1 through P$k$, placed under the control of the secondary clock C1, is used to introduce the bits coming from converter or modulator 8 into buffer circuit 9. A secondary clock C2, placed under the control of a master clock C, is used to extract the contents from buffer register 9 through AND circuits P'1 through P'$k$. The outputs of AND circuits P'1 through P'$k$ are connected to OR circuit 01 the output of which drives OR circuit 02. Circuit 02 also receives the output of an AND circuit E, the latter receiving the output of delay line 10, on one hand and the clock pulses coming from secondary clock C3, on the other hand. FIG. 4 shows how the circuit of FIG. 3 operates.

The vocal signal is represented on line S.V., and the $K$-bit trains contained in delay line 10 at instants T1, T2, ... T$n$ are represented on line L.R. As mentioned above the buffer circuit 9 contains $k$ bits with a time duration equal to $k\tau$; these $k$ bits are extracted through intermediary of gates P'1 through P'$k$ in the form of bit pack of time duration $Ko$. Once the delay line is filled up, there can be seen that all the trains of bit packs (line L.R.) correspond to one another as shown in recordings W1, W2, ... Wn which are successively stored in the delay line. At instants T1, the contents of the delay line is read, i.e., the n packs of k bits, and pack n of k pulses is destroyed with the help of AND circuit E, and k new pulses are put in its place which shifts the recording contained in the line by kτ. At instants T2, the contents of the delay line is read through intermediary of AND circuits E, pack (n-1) of k pulses is destroyed (shown in line L.R.), and k new pulses are introduced in its place, which shifts anew the recording contained in the line by kτ. The n packs of k bits successively extracted at instances T1, T2, ... Tn, are applied to digital-analogue converter 12 which gives out the compressed vocal signal at its output, as shown in line C.D.A. With such an introduction and reading mode, the voice frequency spectrum is continuously scanned. The signal evolves without interruptions.

Figure 5:
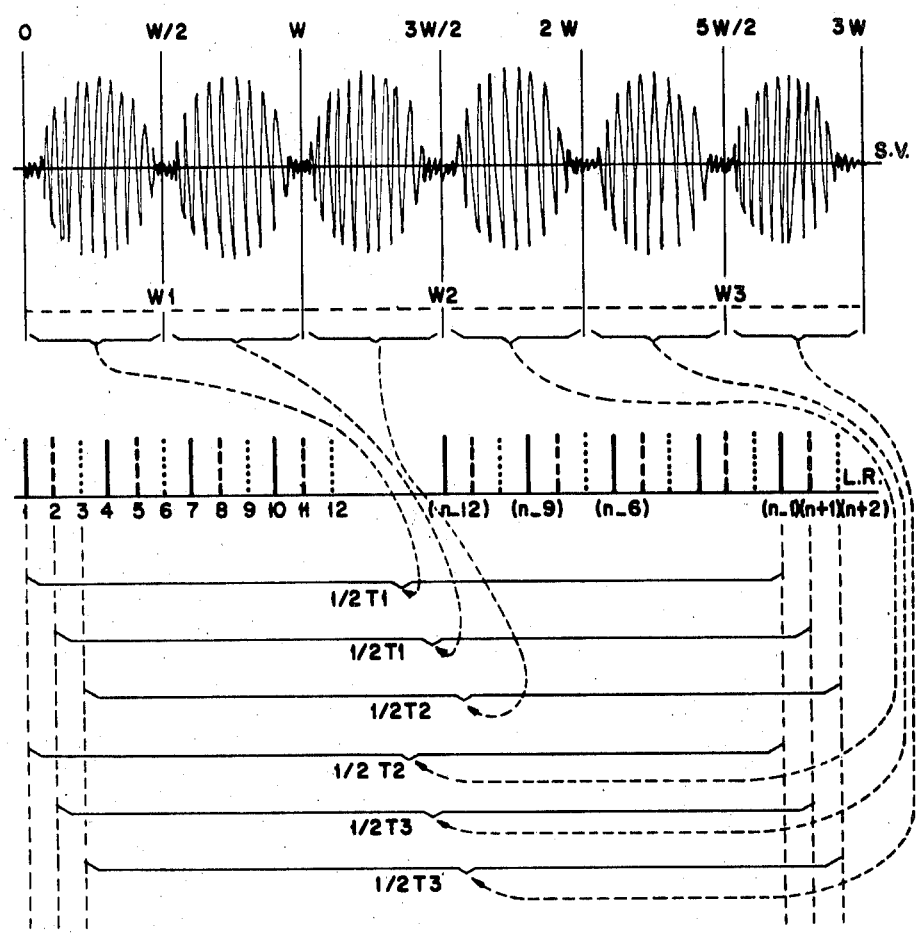

The memory mode operation will now be considered with reference to FIG. 5 which shows the vocal signal on line S.V. and the pulses introduced in an interleaved manner into delay line 10, on line L.R. DUring instant T1, the digital form of recording W1 will be introduced into the delay line, and this, in introducing the bits corresponding to the first half of W1 in positions 1, 4, 7, 10 ... n of the delay line during one-half of T1 and the bits corresponding to the second half of W1 in positions 2, 5, 8, 11...(n+1) of the delay line during the remaining one-half of T1. During instant T2, the digital form of recording W2 will be introduced into the delay line and this in introducing the bits corresponding to the first half of W2 in positions 3, 6, 9, 12 ... (n+2) of the delay line during one-half of T2, and in introducing, during the remaining one-half of T2, the bits corresponding to the second one-half of W2 in positions 1, 4, 7, 10 ... n of the delay line instead of the bits of the first part of recording W1 which are extracted from the delay line. Therefore, it can be seen that in order to be able to read the contents of the delay line which corresponds to a recording of given time-duration W, 2½recordings, namely 2.5 W, must have been introduced in the delay line. With reference to FIG. 5 there can be seen indeed that for reading one-half of T1 plus one-half of T1 (corresponding to recording W1), one-half of T1 plus one-half of T1 (which is extracted), plus one-half of T2 plus one-half of T2, plus one-half of T3 must have been memorized in the line.

It can be seen that in this operation mode, recordings W1, W2, W3, etc. are succeeding without overlapping as it is the case in the oblique mode, but one after the other, which proves useful in the case when the signal changes rapidly.

It can be seen that in this operation mode, recordings W1, W2, W3, etc.... present in the delay line, succeed one another without overlapping, as is the case in the oblique mode operation, which proves useful in the case where the signal changes rapidly.

Either oblique mode, or memory mode operation is obtained by modifying the clock control of buffer circuit 9 and that of the delay line. In memory mode operation, the speed of both clocks is not longer similar, at the line input, the buffer circuit 9 control clock has a speed half of the delay line clock and during reading, output circuit 11 control clock has a speed half of that of the latter.

Figure 6:
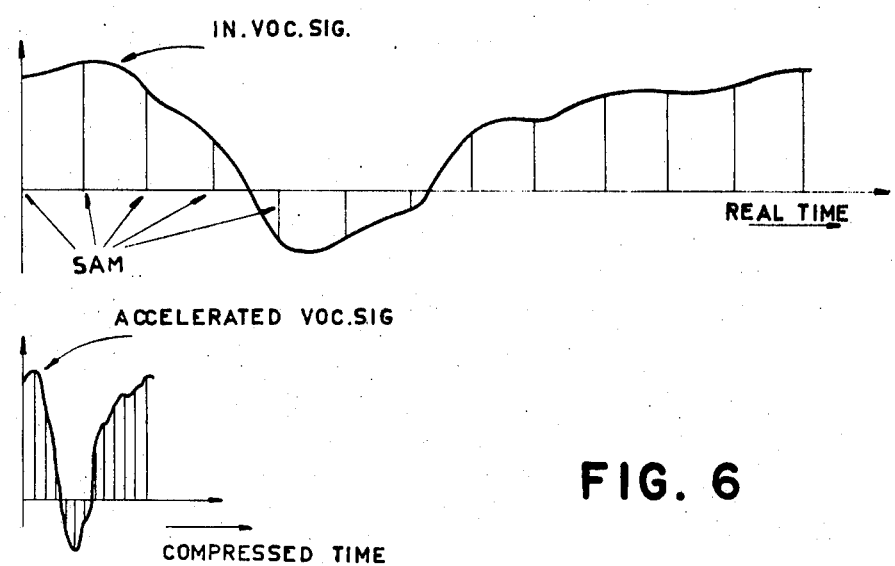
Figure 7:
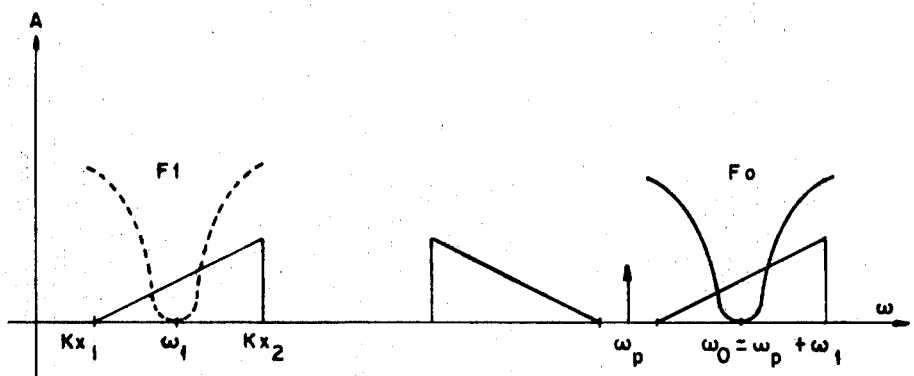

At the output of the digital-analogue converter 12, we now have the vocal signal, compressed in time or, which is the same, a vocal signal whose frequency spectrum has been expanded in time (see FIG. 5). On FIG. 6 is represented the vocal wave coming in the analysis device (IN.VOC.SIG.) in real-time, and the accelerated vocal signal (ACC.VOC.SIG.) issuing from the digital-analogue converter 12 in compressed time. Suppose that the real-time vocal wave occupies frequency band (x1, x2), and that the frequency multiplication coefficient of the delay lines is $$K = \frac{W}{T},$$

the time compressed vocal signal then occupies the frequency band (kx1, kx2). It is this last signal, represented on FIG. 6, which is applied to modulator 13. In prior art vocoders, the "-spectrum function" analysis is effected by means of a bank of filters covering the vocal signal frequency band, in the present example, this analysis will be effected by means of the analysis device which comprises modulator 13, stepped oscillator 14 and filter 15. In other words, to analyze the signal occupying frequency band (kx1, kx2) of FIG. 6, only one filter will be used, that is filter F0 centered on wo. This filter Fo corresponds to a filter F1 centered on w1, it is located in the compressed frequency band. To analyze the vocal signal (kx1, kx2), it is therefore necessary to move the spectrum within the analysis window defined by filter F1. This analysis will be effected on the spectrum processed with the frequency modulation carrier wp, which carrier will be variable in order to move the new spectrum in front of the window defined by filter Fo centered on frequency wo=wp+w1. Carrier frequency wp will be modified under control of stepped oscillator 14, according to the various samples issuing from delay line 10. With a stepped frequency operation, the system will be equivalent to a bank of fine filters analyzing a vocal frequency band. This stepped frequency operation may be carried out in two ways: either by a classical method, or by a zigzag operation method. However, oscillator 14 may be a linear variation oscillator, instead of a stepped oscillator, in that case the system produces the frequency spectrum envelope. This envelope may be analyzed by means of integrators and differentiators to extract the formants and antiformants Δ-modulation of the spectrum. However, this is not the example chosen to illustrate the invention, and only stepped frequency operation will be dealt with hereunder.

In all cases, thanks to the frequency expansion of the vocal spectrum obtained by means of waveform acceleration, the bandwidth Δf of filter 15 can indeed be relatively wide and still present a frequency resolution similar to that presented by a real time, very narrow band filter. One of the advantages presented by this analysis technique resides in the fact that filter 15 registers the passage of the complete frequency band to be analyzed, in a period of time equal to that necessary for a filter having an equivalent resolution and working in real time, to analyze the frequency band corresponding to a sample of the vocal signal produced by delay line 10. Another advantage of this technique is that it insures complete uniformity of analysis characteristics over the entire vocal band, through use of the same filter and same circuits.

Figure 8:
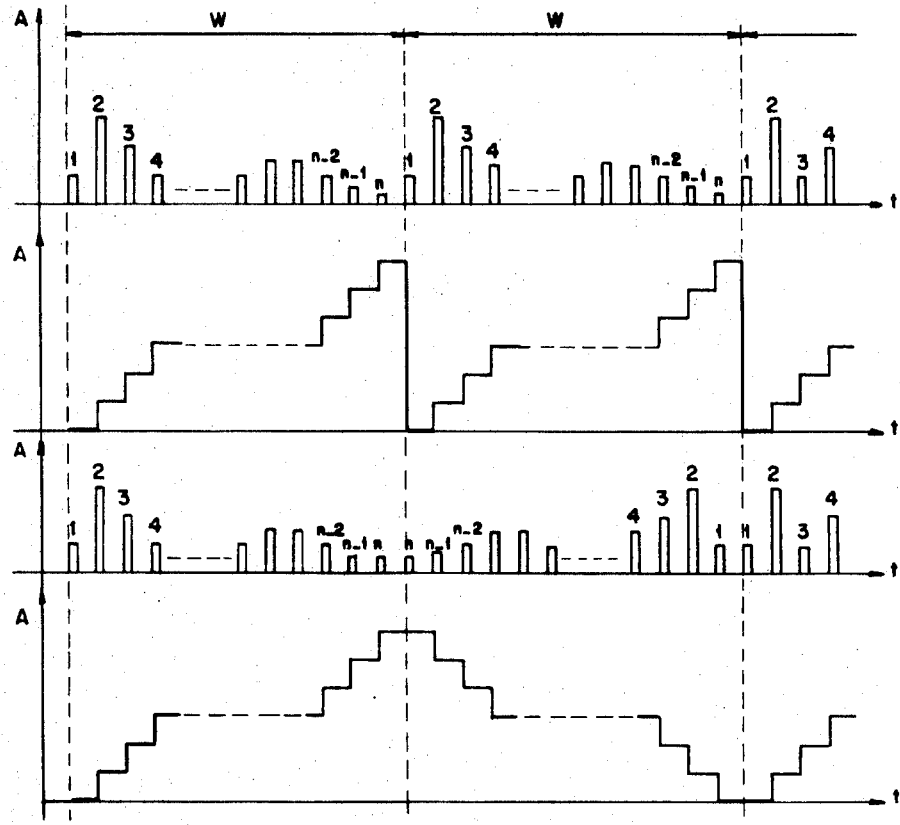

The output of level detector 16 thus provides, at instants determined by delay line 10 rate of sampling, a voltage which is proportional to the energy contained in a band of the spectrum to be analyzed. This succession of pulses is coded in a particularly simple manner, by using the vocal spectrum redundancy properties. A Δ-modulation method is used. The coded signal is sampled every time the level detector 16 delivers an amplitude modulated pulse. Thus is obtained, at the output of modulator 17, a digital signal which is sent to the storage device 21. The signal issued from detector 16 not starting from zero, the problem raised by its Δ-modulation coding is eliminated by expedient of the zigzag scanning already mentioned. FIG. 8 represents the pulse trains produced by level detector 16 every w milliseconds, that is to say, for each recording stored in delay line 10. The first line represents the energy pulses delivered by detector 16 .. in the sequence 1, 2, 3, ... (n−2), (n−1), n, 1, 2, 3, ... (n−2), (n−1), n, in the case where the multivibrator controlling oscillator 14 is driven by a signal of the form shown on the second line. The scanning thus obtained is classical, the scanning used in the present invention (zigzag scanning) is represented on line four of the FIG. When the multivibrator controlling modulator 13 is driven by a signal of such a form, the exit order of the pulses produced by level detector 16 is modified. These pulses exit in the order represented on line three, that is: 1, 2, 3, ... (n−1), n, n, (n−1), ... 3,2,1, thus ensuring a continuity in the signal to be coded, the spectrum evolving continuously. This method of coding the energy spectrum permits the use of a particularly simple coding device (low frequency Δ-modulator which does not present the 0 defect and having a minimum bit rate. In the case where the analysis requires the use of a linear variation oscillator, instead of a stepped one, it has been noted that filter 15 output provides the frequency spectrum envelope. Such envelope is available at the output of line 18 for display on a cathode ray tube if required.

Figure 9:
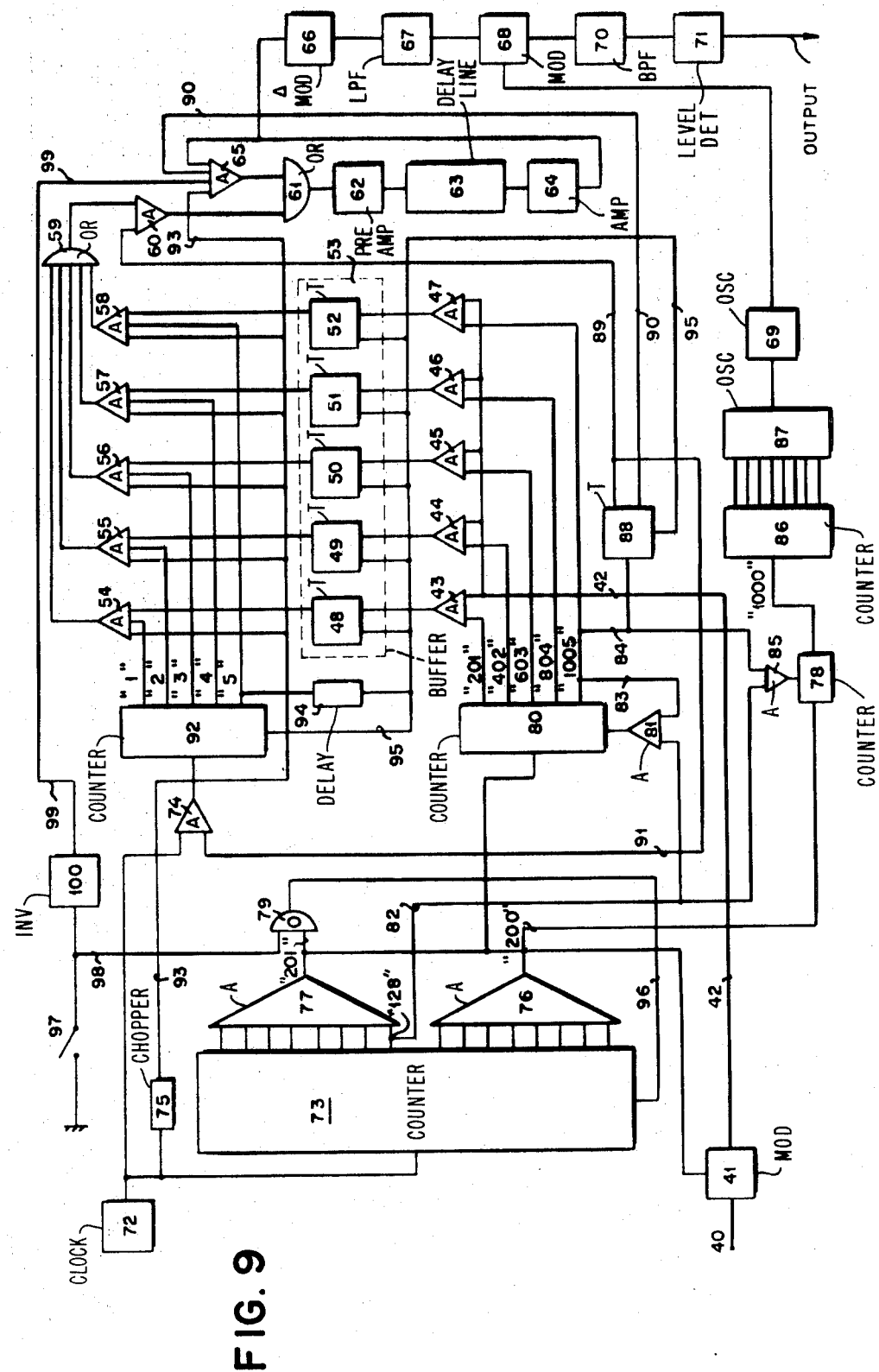

FIG. 9 represent a possible embodiment, according to the invention, of a voice analysis device and, more particularly a "spectrum function" analysis device. The vocal signal applied on input 40 of the analysis device, is converted into digital form in modulator 41. The signal issuing from this modulator is sent, via line 42, to AND gates 43, 44, 45, 46, and 47 whose outputs are respectively connected to latching triggers 48, 49 50, 51, and 52. These five triggers make up the intermediate buffer circuit 53, Outputs from triggers 48 to 52 respectively drive AND gates 54 to 58 the outputs of which are connected to OR circuit 59. The output of this OR circuit is connected to one input of AND circuit 60 whose output is connected to one of the 2 inputs of OR circuit 61. Preamplifier 62 receives the output signal from OR 61 and applies it to delay line 63. The output signal issuing from the latter is sent to amplifier 64 which produces a signal applied on one hand to AND circuit 65 in order to be injected in the delay line and, on the other hand, to Δ-demodulator 66 whose output signal corresponds to the time compressed vocal signal. This signal is sent through low-pass filter 67 and is applied to modulator 68 controlled by the variable frequency oscillator 69. The output signal from modulator 68 passes through band-pass filter 70 and is applied to level detector 71. The output signal issuing from the latter may be coded in a correct digital form in order to be stored. Synchronization and control of this device is effected through clock 72.

Clock 72 controls a high speed counter 73, an AND gate 74 and a chopper circuit 75. The high speed counter 73 controls two AND circuits 76 and 77 whose outputs are respectively connected to counter 78 and OR circuit 79 and to Δ-modulator 41 and low speed data counter 80. This last counter controls the opening of gates AND 43 to AND 47, it is reset by signals transmitted through AND gate 81 and sent on lines 82 and 83 respectively from high speed counter 73 and counter 80. Counter 78 is reset by the simultaneous transmission of a signal on line 82, from high speed counter 73, and on line 84 from low speed counter 80. Both lines 82 and 84 are connected to the inputs of AND circuit 85 whose output controls the resetting of counter 78. This counter controls another counter 86 which monitors a stepped oscillator 87 the output of which drives a variable frequency oscillator 69. The pulses transmitted along line 84 are also applied to a Read-trigger 88 whose ON output is connected to AND gate 60 via line 89 and whose OFF output is connected to AND gate 65 via line 90. The ON output is also connected to AND gate 74 via line 91. THe output of AND 74 is connected to high speed counter 92 which controls the opening of gates AND 54 to AND 58, simultaneously with pulses issued from chopper circuit 75 and travelling along line 93. These clock chopper pulses are also sent, via line 93, to AND circuit 65. Buffer circuit 53, high speed counter 92 and trigger 88 are reset by a signal issued from counter 92 and applied, via line 95, through delay element 94. High speed counter 73 is reset by a signal produced by OR circuit 79 on line 96. A switch 97 allows the whole analysis device to be reset to its initial state, by means of line 98 connected to OR circuit 79 and line 99 which connects inverter 100 to AND circuit 65, this inverter input being connected to line 98.

The operation of the device, according to FIG. 9, is totally under control of clock 72 working on 10 megacycles. Under the control of this clock, the high speed counter 73 provides at the output of AND gate 76, some pulses called 200, and at the output of AND gate 77, some pulses called 201. The time interval between two 200 pulses is equal to 200 ×100 nanoseconds =20.1 microseconds. Bringing the high speed counter 73 back to its initial state is effected with the help of the 201 pulse, sent through OR circuit 79 and on to line 96, and a 50 nanoseconds clock pulse. Thus, counter 73 can count without interruption. Each 201 pulse also controls Δ-modulator 41 which transforms the vocal signal into a pulse train, thereby producing at the output of the said Δ-modulator a high and a low level every 20.1 microseconds.

These high and low levels are injected in buffer circuit 53, under the control of low speed data counter 80 which advances every 20.1 ms. A complete analogue-digital conversion in Δ-modulator 41 requires five bits, that is to say 20.1 ×5 =100.5 μ. This means that the modulator operates at a speed of 49,750 bits per second. In order to inject the data into register 53, counter 80 delivers pulses at time 201, 402, 603, 804, and 1005, thus opening successively AND gates 43 to 47 and permitting the loading of latching triggers 48 to 52 respectively. As soon as the pulse corresponding to time 1005 is sent on line 84, read trigger 88 is set ON thereby energizing line 89 connected to AND gate 60, and line 91 connected to AND circuit 74, the high speed counter 92 can then be set to work. However, the pulse corresponding to time 1005 is sent, via line 83, to AND circuit 81. When the pulse corresponding to time 128, issued from counter 73 is sent on line 82, it is applied to AND circuit 81. Bringing data counter 80 back to its initial state occurs when times 1005 and 128 intersect. This intersection occurs during time 201 that follows.

The high speed data counter 92 delivers pulses at respective times 1, 2, 3, 4, and 5, towards AND gates 54 to 58. These pulses, combined with the states of buffer register 53 latching triggers and with the sampling signal present on line 93, permit the serialization during 500 nanoseconds of the data delivered by Δ-modulator 41 in a period of 100.5 μs. These data will be injected in delay line 63, between times 1005 and 1010. Indeed, an OR circuit 59 having five inputs coming respectively from AND gates 54 to 58, allows the data to be applied on one of the inputs of AND circuit 60 whose other input is driven by Read-trigger 88 to which it is connected, between times 1005 and 1010, by conductor 89. It is used to increase the safety in injecting data into delay line 63. The output of AND circuit 60 is connected to one input of OR circuit 61 whose other input receives the bits from delay line 63, via AND circuit 65, after they have been delayed during the OFF condition of Read-trigger 88.

The high speed counter is brought back to its initial state by the time 5 pulse delayed by 50 nanoseconds in delay line 94 and sent on line 95. Delay line 63 having a duration T of 100 μs and the pulses injected therein a duration of 100 nanoseconds, it is possible to introduce in the said delay line a total of 1000 bits. These thousand bits will be injected by groups of five bits and in the time period comprised between times 1005—1010; 2010—2015; 3015—3030; 4020—4025; etc. The delay line will be filled after a period of time equal to 100.5 μs $$\times \frac{1000}{5} = 20.1 \ ms.$$

It is thus possible to store in delay line 63, the information obtained at the output of Δ-modulator 41 and corresponding to 20.1 ms. of the vocal signal. After this period of time, the five bits produced by Δ-modulator 41 after 20.1 μs + 100.5 μs replace the five bits injected in the delay line between times 1005 and 1010, and so on. In this manner it is possible, in 100 μs, to read the data produced by Δ-modulator 41 in 20.1 milliseconds.

Regeneration of the bits going through delay line 63 is obtained with the help of AND circuit 65 which has four inputs: the output from delay line 63, after passage through amplifier 64, the clock sampling from line 93, the signal from Read-trigger 88, sent via line 90 and the general reset to "initial state" line 99. Thus, the 20.1 ms. of speech being available in 100 μs, we have a time compression coefficient equal to 20.1;

that is to say a signal frequency multiplication by 201. Consequently, supposing that at input 40 of the device the vocal signal band width is equal to 300 Hz.—4,000 Hz., the output signal from Δ-modulator 66 will cover the 60,300—804,000 Hz. band. Low-pass filter 67 eliminates the frequencies above 804 kHz.

In a similar manner as counter 80 is controlled by the 201 pulses, counter 78 is controlled by the 200 pulses produced every 20 μs by high speed counter 73. The latter is a five position counter which produces a signal every 100 μs. This signal, called signal 1000, controls counter 86 which can count up to 201. The binary outputs 2, 4, 8, of this counter are used to realize a time-voltage conversion in stepped oscillator 87 which produces a stepped signal controlling the variable frequency multivibrator 69. Each flat portion of this signal has a duration of 200 μs. The control voltage variation of the multivibrator allows this element to oscillate between 2 MHz and 1.26 MHz. The high frequency output signal from low-pass filter 67 is applied to modulator 68 together with the output signal from multivibrator 69. Thus, since data corresponding to 20.1 milliseconds of the vocal signal give a 100 μs duration signal in the high frequency domain, and that during 200 μs this HF domain is sampled at a speed which varies every 200 μs, it is possible to simulate a bank of 100 filters used for analyzing the high frequency signal, with only one band-pass filter. The band-pass filter 70 installed at the output of modulator 68 presents the following characteristics:

Middle frequency = 2.06 MHz.

F band width = 20,000 Hz.

$$t' = \frac{1}{\Delta F} = 50 \mu s$$

Filter 70 corresponds to a filter located in a domain of vocal frequencies having a band width of approximately 100 Hz. and for which τ'=10 ms. Thus, in the low frequency domain, multivibrator 69, modulator 68 and band-pass filter 70 are equivalent to a bank of 100 filters each having a 100 h3. Hz. band-width and such that the interval between two consecutive filters is equal to $$\frac{4000-300}{100} = 37 Hz.$$

Level detector 71 is used to store the maximum values of the analyzed vocal signal.

In brief, the "spectrum function" channel of a vocal sound analysis device thus obtained is less bulky and less expensive than those known up till now and it permits a finer analysis of the vocal spectrum, thanks to the time compression device used.

The "excitation function" will be compressed in a same manner as the "spectrum function." To this end, the circuitry represented on FIG. 10 will be used. The elements which, on this FIG., are indentical to those of FIG. 1, are identically referenced. The "excitation function" channel is connected to the "spectrum function" channel, at point 101 located on the output of demodulator 12 (PCM-Δ-modulation). The base band used as "excitation function" occupies the 300 Hz. — 900 Hz. spectrum of the vocal band: it has been seen in the previous example that the action of delay line 10 is to multiply the signal frequency by 201, consequently, to recover the base band at the output of Δ-demodulator 12, it is necessary to provide a band-pass filter 102 which covers the 60.3 — 180.9 kHz. band. The output of the filter 102 is then applied to analogue-digital converter 103 (Δ-modulator for example) in order to obtain the signal allowing storage of the excitation information.

Thus, storage 21 contains all information necessary for the reconstitution, in digital form, of the analyzed vocal signal, that is to say the "excitation function" and the "spectrum function." It is now desired to reconstitute these vocal sounds.

What are the necessary successive steps to be followed in order to recover these sounds? During the analysis it has been noted that the vocal signal was subjected to two treatments, a time compression and the analysis proper. These two operations will be met again, but in reverse order, during reconstitution of the compressed vocal signal, followed by a time expansion to recover the vocal signal in the audio band. Referring to FIG. 2, already described at the beginning, these two steps will be carried out by devices 20 and 24.

During analysis, the vocal signal has bee divided into elementary signals of 20 ms. It must be further recalled that the device delay line allows the storage of 200 five-bit signal samples, with an interval of 100.5 μs between consecutive five-bit groups. On FIG. 11 is represented the sampled vocal signal and the resulting time compressed samples. The vocal signal is compressed during periods OA, AB, BC, etc. to provide signals O'A', A'B', B'C', etc. Signal O'A' is analyzed in 100 μs and it corresponds to sample OA compressed and analyzed between instants 20 ms. and 20.1 ms. The next five-bit sample arrives at instant 20.1005 ms. Therefore, the vocal signal analysis takes place during periods 20—20.1 ms., 40—40.1 ms., etc. In fact the analyzing filter presents a time-constant and its output provides a signal which spreads up to A'2, as illustrated on FIG. 12. It has therefore been decided that the analysis filter operates during periods: 20—20.2 ms., 40—40.2 ms., etc. thus permitting as already stated 100 analysis per 20 ms. The analysis device according to the invention is therefore identical to a vocoder comprising a bank of 100 filters covering the vocal band, and one filter defining the base band.

There exists in the prior art, a so-called base band vocoder which utilizes the "spectrum function" channel of a classical vocoder and, as the "excitation function" channel, a filter which defines the base band. During sound recovery the base band is used to energize each frequency band corresponding to the analysis filters. The "spectrum function" signal controls the modulators of the various bands dividing the frequency spectrum, which modulators receive the base band and whose respective outputs drive the filters which define each analysis band. It is thus seen that in order to reconstitute the vocal signal it is necessary, on one hand, to define the analysis frequency bands and, on the other hand, to effect an amplitude modulation of the basic band within these bands with the help of the "spectrum function." This is going to be done in a particular embodiment of the voice recovery device according to the invention.

During the description of FIG. 2, it was noted that the "spectrum function" information was provided by memory 21 and sent, via line 23, towards modulator 30. It is therefore necessary that, at successive instants when the "spectrum function" information appears on modulator 30, the said modulator be located within the various successive frequency bands corresponding to the successive frequency bands within which the vocal signal has been analyzed. To this end, the "excitation function" signal extracted from memory 21, is subjected to a nonlinear distortion in circuits 25 and 26, and is applied to the variable middle frequency filter made up by oscillator 28, modulator 27 and band-pass filter 29. Since in the example considered the analysis is effected with the help of a stepped oscillator, oscillator 28 will be of that type. It must be understood that a linear variation oscillator could be used if the analysis required the use of such a device.

Figure 13:
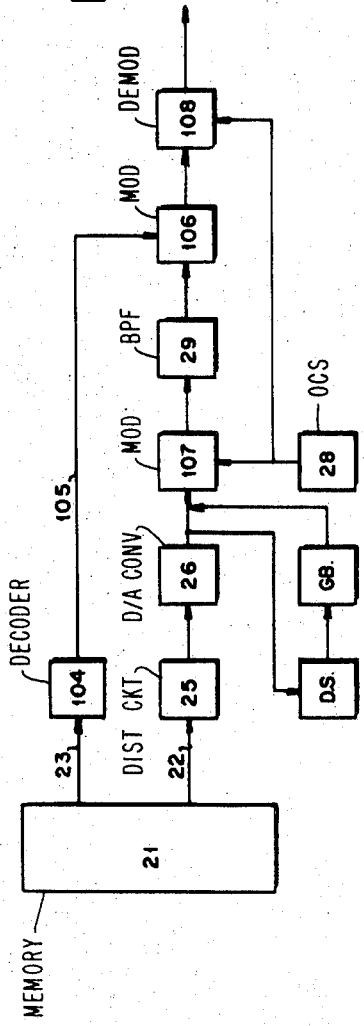
Figure 14:
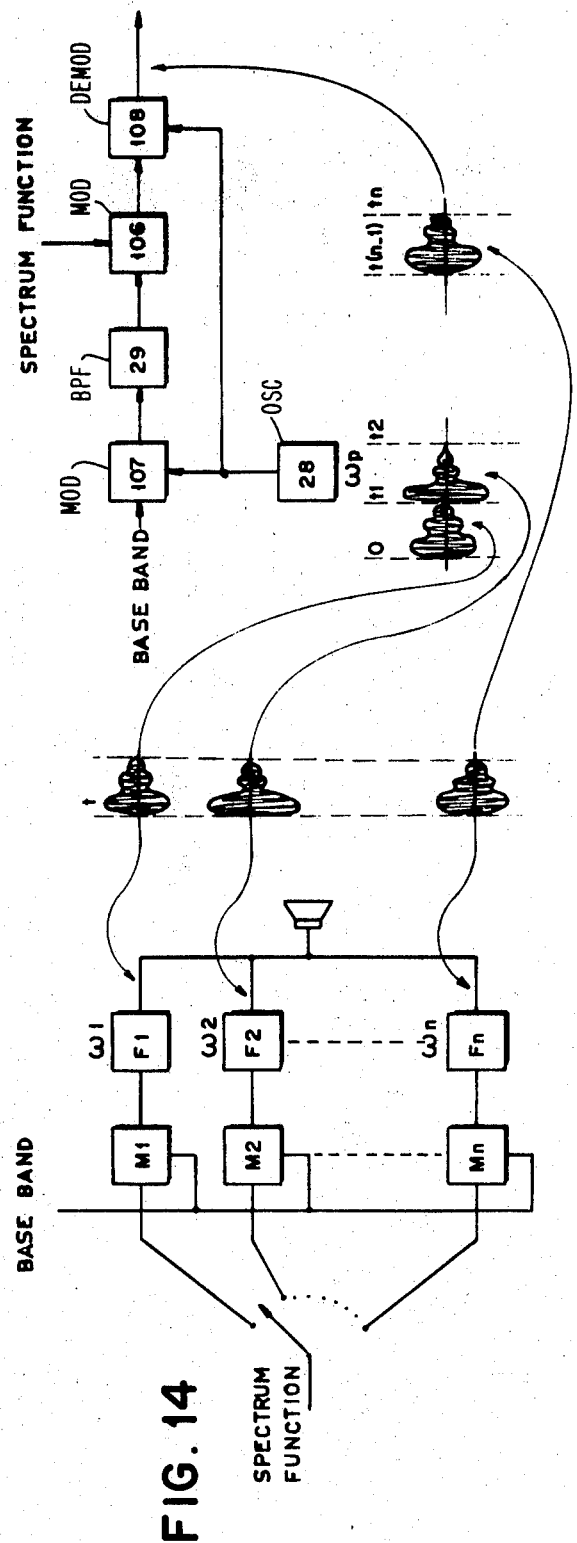

During analysis, 20.1 ms. of vocal signal have produced a 100 μs signal in the high frequency domain (FIG. 6). This HF domain is divided into frequency zones which are modulated at different frequency every 200 μs. The used multivibrator covered the band 2 MHz.—1.26 MHz. and the analysis filter was centered on 2.06 MHz. and has a 20 kHz. band width. Therefore, the Δ-modulation coded digital form of a 100 μs signal was stored every 200 μs. At recovery the same values will be used. FIG. 13 is a more detailed representation of recovery portion 20, than FIG. 2. Every 200 μs memory 21 will produce, on line 23, the digital spectrum information which is applied to a decoder 104 whose output will produce pulses having amplitudes corresponding to the analysis filter output signal maxima which were detected by level detector 16 (FIG. 1). These variable amplitude pulses are sent, via line 105, towards modulator 106. Similarly, the digitized basic band stored in memory 21 is extracted and sent, via line 22, towards a digital distortion circuit 25 and from there, towards a digital-analog converter 26. This base band information is extracted from storage every 200 μs and has a 100 μs duration, that is to say for each step of oscillator 28. The base band obtained occupies the 60.3—180.9 kHz. frequency band determined during the analysis.

Figure 15:
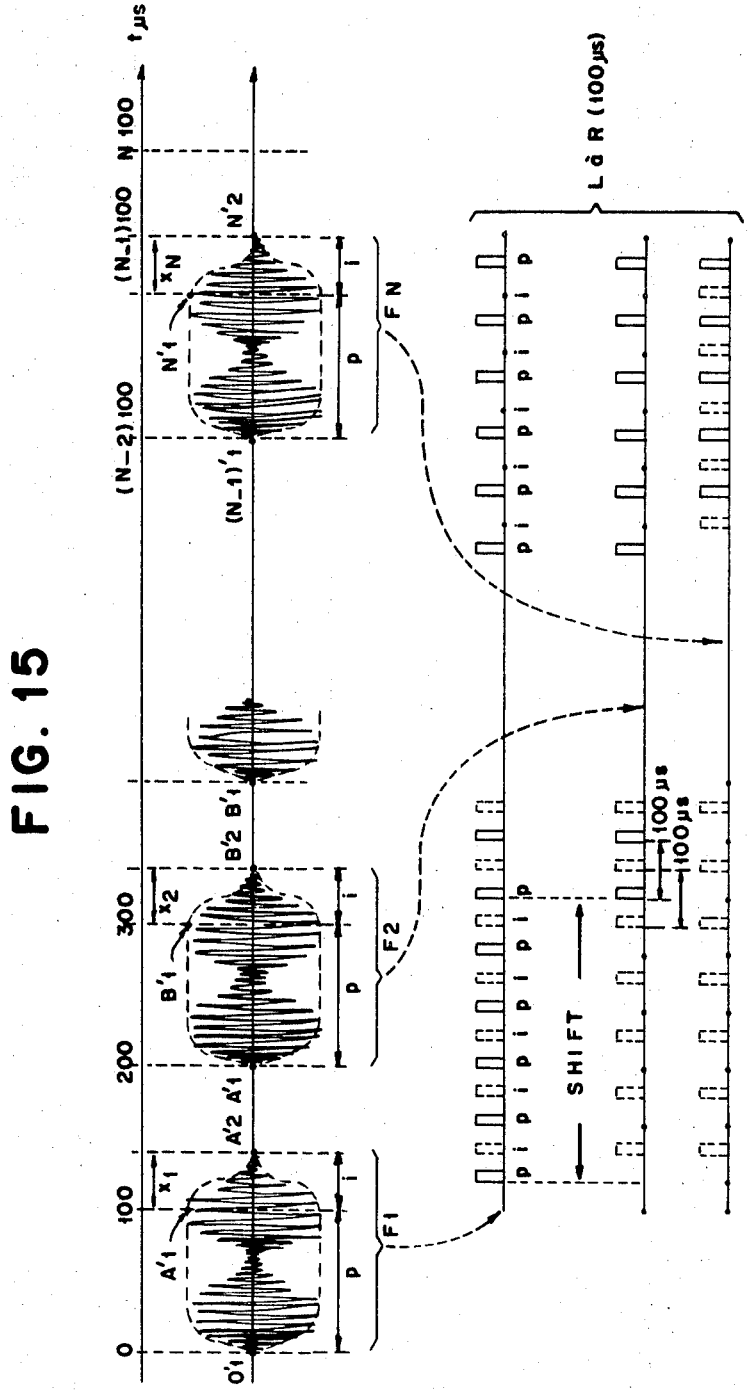

The analogue signals produced by demodulator 108 are sent over line 31 (FIG. 2). In order to carry out the addition of these filter responses, each of them will be converted into digital form in code or modulator 33 (PCM-Δ-modulation. Modulator 33 operates at 10 MHz., every 200 μs it receives the response of one of the simulated filters, of duration (100=R) microseconds and consequently, its output provides every 200 μs a pulse train of duration (100=R). R is a function of the filter damping and corresponds to damping time A'1, A'2. FIG. 15 represents the process of adding the various responses from simulated filters F1, F2, ... FN. Thus, response O'1 A'1 A'2 from simulated filter F1 will be injected into the delay line in an interleaved manner, the pulses corresponding to the first 100 μs will be placed in the even positions, for example, and the pulses of the next $x1 \mu s$ will be placed in the odd positions, positions which will not be all occupied. At time $T = 200$ μs, response A'1, B'1 B'2 of simulated filter F2 will appear on modulator 33, it is coded and injected in such a manner that the pulses corresponding to the first 100 μs are introduced into the even positions already occupied by the pulses corresponding to the first 100s of filter F1 response, and that the pulses corresponding to the $x2 \mu s$ are introduced into the odd positions of the delay line. This writing process is carried on until the responses from the N simulated filters are injected into delay line 34. The time intervals between pulses, in delay line 34, are indicated on FIG. 15; between two pulses located in two successive even positions, there is an interval of 100 nanoseconds and between an even position pulse and the next odd position pulse, there is an interval of 50 nanoseconds.

However, it should be noted that the analogue responses of simulated filters F1 through FN reconstituted in the reconstituting device, correspond to the responses obtained for these filters F1 through FN during the analysis operation. But, during the analysis operation, an analysis was carried out every 200 microseconds by changing the frequency of oscillator 14 (FIG. 1) every 200 microseconds. At each so-defined step, the contents of the delay line of the analysis device was analyzed, but these contents were modified each time for the oldest two packs of five bits were destroyed; in fact, this operation corresponded to a shift of the whole bit train in the delay line. This shift will be present anew in the delay line of the reconstitution device, as shown in FIG. 15.

Figure 16:
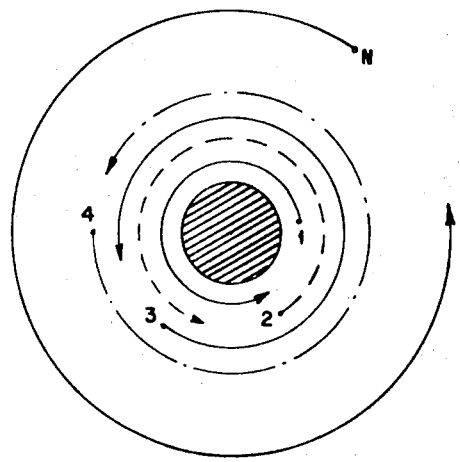

If a delay line long enough so as to contain the 100 microseconds plus the $x$ microseconds of each filter response, had been chosen, the latter would have been interleaved. If this case is considered, this stroboscopic phenomenon of the various filter responses contained in the delay line is clearly apparent, as shown in FIG. 16. Consequently, there is still obtained the sum of the corresponding pulses of the N simulated filters in each of the bit positions, once the delay line is loaded. In the case when the first 100 microseconds and the $x$ following microseconds are interleaved, the results remain valid for, when there is not enough left in view of the shift in the even positions for the first 100 microseconds, the remaining bits are introduced into the odd positions. Thus, it will suffice to read successively the even positions, then the odd positions, to start anew with the even ones, and so on. Thus, in the signal, the first 100 microseconds of the even positions will be extracted, then, the 100 following microseconds of the odd positions, etc. With reference to FIG. 16 the reason of this operation is quite clear since, in that case, the whole line is read and again, without any interruption.

This succession of addition is obtained, in the case of Δ-modulation, with the help of the loop passing through decoder or demodulator 38 which is a Δ-demodulator operating on 10 MHz., in order to effect the additions in analogue form, through gate 32. In the case of classical PCM modulation, it is not necessary to use demodulator 38 because the additions are effected in digital form directly in the delay line, by adding the corresponding bits of each wave form. During analysis, it has been noted that five bits were used to define the information and that, consequently, this information was injected by packs of five bits, in the delay line. Inversely, it will now be necessary to extract this information by packs of five from delay line 34 in order to expand the signal and to recover the vocal signal in the domain of vocal frequencies.

Figure 17:
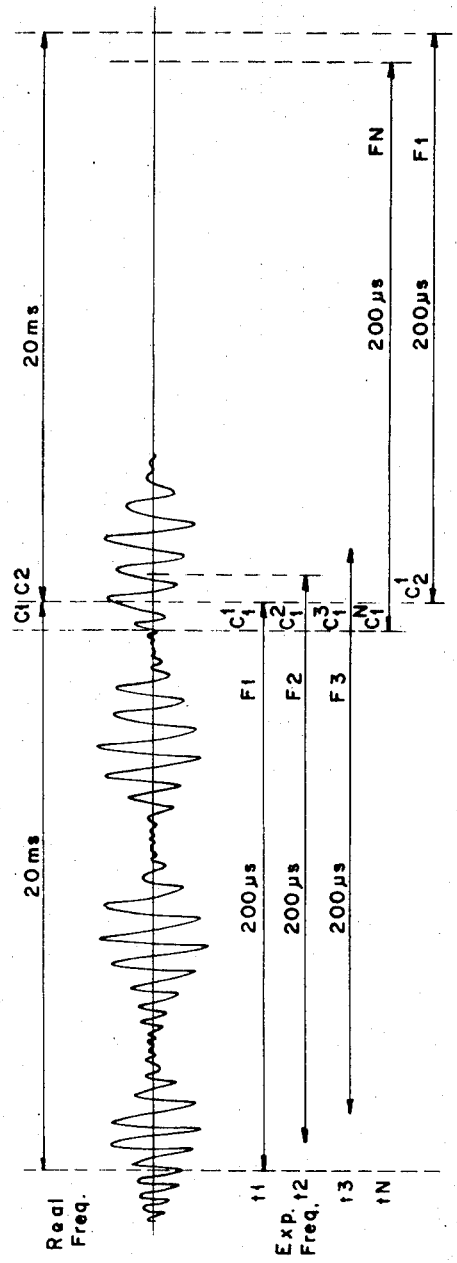

Referring to FIG. 17 and to what has been said with regards to the successive additions, in delay line, of the various responses from simulated filters, it is remarked that to the first signal corresponding to filter F1, the first injected five bits represent the analysis of C1 by this first filter F1, therefore $C^1$ after injection of the signal corresponding to filter F2. The first five bits represent the analysis of C1 by filters F1 and F2, that is $C^1 = C^2$ after the injection of the signal corresponding to filter F3, in the delay line, the first five bits represent the analysis of C1 by filters F1, F2, and F3 that is $C^1 = C^2 = C^3$, and so on until injection of the last signal representing filter $N$, when the first five bits in the delay line represent the signal in zone C1 and have gone round 200 times in the delay line loop. It will thus be possible to extract this five-bit train by means of buffer circuit 35 (FIG. 2) and send it towards serializer 37 (FIG. 2). This five-bit train has been decompressed 200 times and represents now the digital form of a vocal signal in real time. Thus, in order to have a vocal signal correctly reconstructed it is necessary to extract from the delay line, five bits every 100 μs. After 200 extractions, the 20 ms. of the analyzed vocal signal will have been reconstituted.

The successive five-bit trains are applied to the Δ-demodulator or decoder 39 operating at 50 kHz. and from there, to the reconstitution device output.

Figure 18:
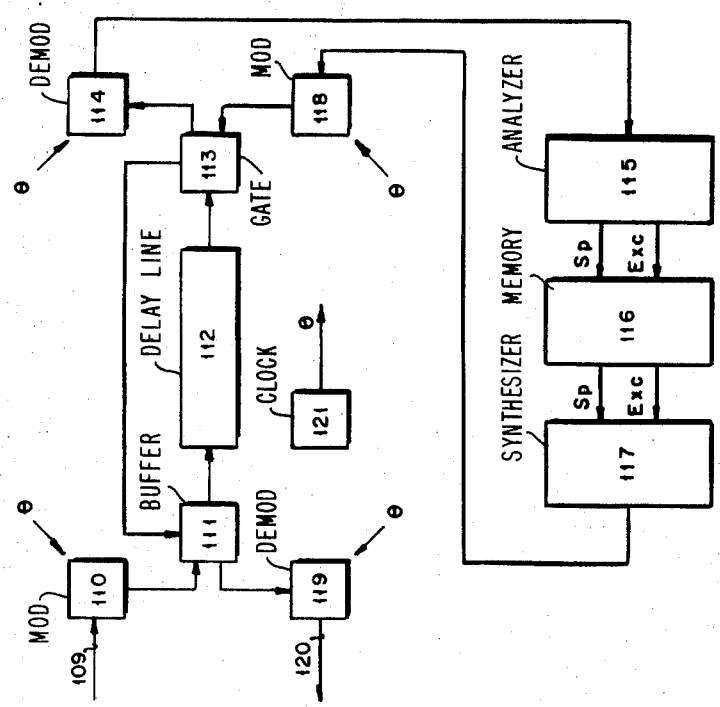
FIG. 18 is a schematical representation of the voice analysis and recovery device according to the invention, wherein the same delay line is used for both analysis and recovery of the vocal signal.

An interesting point of the voice analysis and reconstitution device consists in grouping the two devices represented on FIG. 1 and on FIG. 2 through the use of only one delay line. This is made feasible by interweaving the digital signals which have to be compressed and decompressed, in the delay line. The device thus obtained is represented on FIG. 18. The vocal signal to be analyzed is applied on input 109 and sent towards Δ-(or PCM) =modulator 110. After passing through buffer circuit 111, the pulses are compressed in delay line 112, through gate 113 and are demodulated in Δ-(or PCM)-demodulator 114. The obtained compressed analogue signal is then analyzed in analyzer 115 and the obtained "spectrum and excitation functions" are stored in memory 116. For the reconstitution operation, the "spectrum function" and the "excitation function" are extracted from memory 116 and are applied to synthesizer 117. The compressed vocal signal, obtained in analogue form, is sent to Δ-(or PCM) modulator 118 and the output pulses produced by the latter are decompressed in delay line 112. These decompressed pulses are extracted through buffer circuit 111 and are applied to Δ-(or PCM) demodulator 119. The reconstituted vocal signal is sent on line 120. The whole of the devices is synchronized by clock 121.

Figure 19:
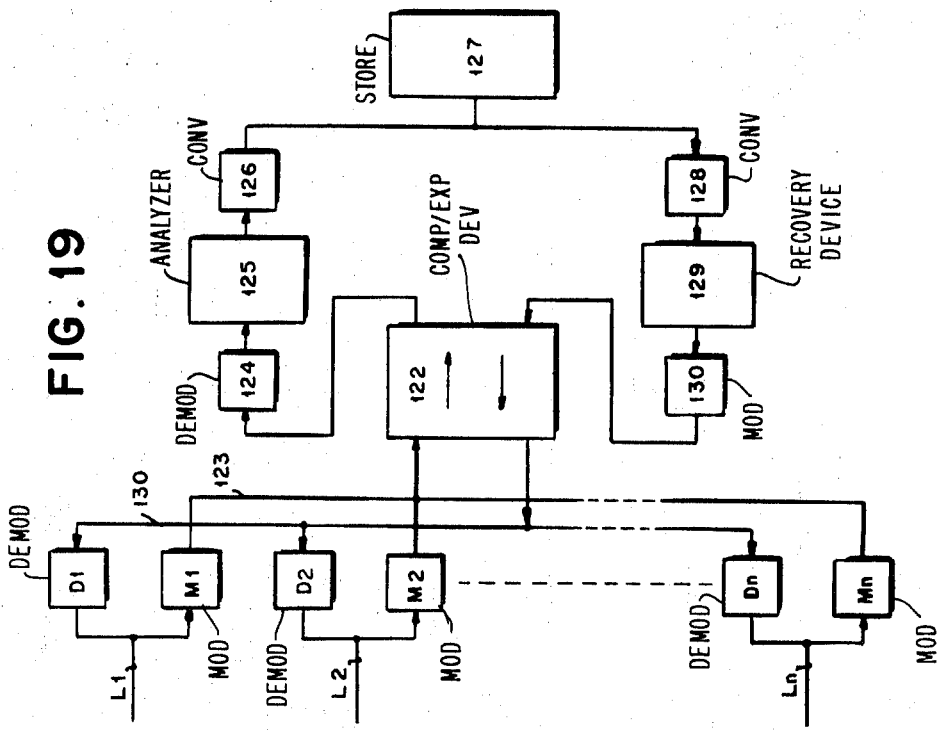
FIG. 19 represents a system according to the present invention, which can be used by several telephone lines.

It can also be noted that the device according to the invention may be used to receive several communications in parallel, for example, on several telephone lines. To this end, it suffices to carry out a multiplexing, by time division, in the delay line while keeping the compression- expansion interweaving necessary for each communication. A possible embodiment of such an assembly is represented of FIG. 19. Each telephone line $Li$ ($1 \leq i \leq n$) is connected to a Δ-(or PCM)-modulator $Mi$ ($1 \leq i \leq n$) and to a Δ-(or PCM)-demodulator $Di$. The outputs from modulator $Mi$ are connected to the compression-expansion device 122, by means of line 123. At compression, the signals from the multiplexed mulitplexed lines are applied to the Δ-(or PCM)-demodulator 124 and from there, are sent to analyzer 125. The analysis results are digitized in converted 126 and are stored in storage device 127. AT recovery, the "excitation function" and "spectrum function" information are extracted from memory store 127, taking into account the necessary multiplexing for sending the vocal signal onto the correct telephone line, and applied to analogue converter 128. The signals obtained are sent to recovery device 129 and the reconstituted compressed vocal signals are then applied to demodulators D$i$ via modulator 130 and compression expansion device 122. These demodulators are time multiplex controlled, in relation to the data extracted from memory 127. The reconstituted vocal signal is thus addressed to the telephone line L$i$ for which it is meant.

While the invention has been particularly shown and described with reference to a preferred embodiment thereof, it must be understood that any person skilled in the art may make any modification of form or detail, without departing from the scope and spirit of the said invention.

We claim:

1. A voice recovery device wherein the vocal spectrum, previously analyzed in time compressed form, and to be recovered is stored in digital form and characterized in that the vocal spectrum recovery is also effected in a compressed time domain, said voice recovery device comprising:
    a first digital to analogue converting means to convert the digital form of the stored vocal spectrum into analogue signals representing the excitation function;
    means responsive to the spectrum function of the stored vocal spectrum and the converted signal from the first analogue to digital converting means for reconstituting, in time compressed form the signals representative of the originally received voice signal;
    analogue to digital converting means for converting the time compressed reconstituted signal into a digital form;
    time expansion and adding means to add and expand the digital signal and produce a pulse train representing the vocal signal in digital form; and
    a second digital to analogue converting means to convert said so-formed digital signal into an analogue output representing said reconstituted vocal signal.

2. A compressed time domain voice signal recovery device responsive to a plurality of digitally stored excitation function and spectrum function data, the spectrum function portion of the voice signal having been analyzed by a filter means in a compressed time domain prior to storage, comprising:
    first digital to analogue converting means for converting into analogue form the coded signals representing the excitation function;
    means responsive to the first digital to analogue converting means output and the stored excitation function data for reconstituting, in time compressed form, analogue signals corresponding to the responses from the filter means which analyzed the compressed spectrum function;
    analogue to digital converting means for converting the reconstituted voice signals into digital form;
    time expansion and adding means receiving the signals from the analogue to digital converting means to add and expand them and for producing at regular intervals a pulse train representing the vocal signals in digital form; and
    second digital to analogue converting means for receiving the signal from the expansion and addition means to convert it into analogue form thereby producing the vocal signal in normal form.

3. A voice recovery device as set forth in claim 2 in which the time expansion and adding means includes a delay line storage device.